US011196690B2

(12) United States Patent
Chung et al.

(10) Patent No.: US 11,196,690 B2
(45) Date of Patent: *Dec. 7, 2021

(54) PROCESSING MEDIA CONTENT IN A MESSAGING SYSTEM

(71) Applicant: Snap Inc., Santa Monica, CA (US)

(72) Inventors: Ken Chung, Los Angeles, CA (US); Rong Yan, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,446

(22) Filed: Mar. 2, 2021

(65) Prior Publication Data
US 2021/0194839 A1  Jun. 24, 2021

Related U.S. Application Data

(63) Continuation of application No. 16/774,912, filed on Jan. 28, 2020, now Pat. No. 10,992,616, which is a
(Continued)

(51) Int. Cl.
*H04L 12/58* (2006.01)
*G06F 16/435* (2019.01)
(Continued)

(52) U.S. Cl.
CPC ............ *H04L 51/08* (2013.01); *G06F 16/435* (2019.01); *H04L 67/2823* (2013.01); *H04L 67/42* (2013.01)

(58) Field of Classification Search
CPC ..... H04L 51/08; H04L 67/2823; H04L 67/42; G06F 16/435
See application file for complete search history.

(56) References Cited

U.S. PATENT DOCUMENTS 6,038,295 A    3/2000  Mattes
6,980,909 B2  12/2005  Root et al.
(Continued)

FOREIGN PATENT DOCUMENTS

CA    2887596 A1    7/2015
CN  109997129 A    7/2019
(Continued)

OTHER PUBLICATIONS

U.S. Appl. No. 15/362,287 U.S. Pat. No. 10,333,875, filed Nov. 28, 2016, Processing Media Content in a Messaging System.
(Continued)

*Primary Examiner* — Wing F Chan
*Assistant Examiner* — Billy H Ng
(74) *Attorney, Agent, or Firm* — Schwegman Lundberg & Woessner, P.A.

(57) ABSTRACT

Systems and methods provide for a server computer to receive a request from a first device to share a plurality of media content items with a second device, the request including a unique identifier for each of the plurality of media content items. The server computer determines a subset of the plurality of media content items to be processed by the first device, generates instructions for processing the subset of the plurality of media content items by the first device, and sends the instructions to the first device. The server computer receives the processed media content items for the subset of the plurality of media content items that were processed by the first device, generates a message enabling access to processed media content items for the plurality of media content items, and sends the generated message to the second device.

20 Claims, 5 Drawing Sheets

Related U.S. Application Data continuation of application No. 16/404,365, filed on May 6, 2019, now Pat. No. 10,630,623, which is a continuation of application No. 15/362,287, filed on Nov. 28, 2016, now Pat. No. 10,333,875.

(51) Int. Cl.
   *H04L 29/08* (2006.01)
   *H04L 29/06* (2006.01)

(56) References Cited

U.S. PATENT DOCUMENTS

| | | | |
|---|---|---|---|
| 7,173,651 | B1 | 2/2007 | Knowles |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,489,661 | B2 | 11/2016 | Evans et al. |
| 9,491,134 | B2 | 11/2016 | Rosen et al. |
| 10,333,875 | B2 | 6/2019 | Chung et al. |
| 10,630,623 | B2 | 4/2020 | Chung et al. |
| 10,992,616 | B2 | 4/2021 | Chung et al. |
| 2002/0047899 | A1 | 4/2002 | Son et al. |
| 2011/0047080 | A1 | 2/2011 | Im et al. |
| 2011/0131272 | A1 | 6/2011 | Littlejohn et al. |
| 2011/0202598 | A1 | 8/2011 | Evans et al. |
| 2011/0276637 | A1* | 11/2011 | Thornton .................. G06F 3/048 709/206 |
| 2012/0209924 | A1 | 8/2012 | Evans et al. |
| 2012/0259932 | A1* | 10/2012 | Kang ..................... H04L 51/066 709/206 |
| 2013/0325952 | A1* | 12/2013 | Draznin .............. H04N 21/4126 709/204 |
| 2015/0156518 | A1* | 6/2015 | Frey ........................ H04N 21/63 725/116 |
| 2015/0244692 | A1 | 8/2015 | Liu et al. |
| 2015/0365454 | A1 | 12/2015 | Chao et al. |
| 2018/0152400 | A1 | 5/2018 | Chung et al. |
| 2019/0260700 | A1 | 8/2019 | Chung et al. |
| 2020/0169517 | A1 | 5/2020 | Chung et al. |

FOREIGN PATENT DOCUMENTS

| | | |
|---|---|---|
| KR | 102206344 B1 | 1/2021 |
| WO | WO-2018097985 A1 | 5/2018 |

OTHER PUBLICATIONS

U.S. Appl. No. 16/404,365 U.S. Pat. No. 10,630,623, filed May 6, 2019, Processing Media Content in a Messaging System.

U.S. Appl. No. 16/774,912, filed Jan. 28, 2020, Processing Media Content in a Messaging System.

"Korean Application Serial No. 10-2021-7001547, Notice of Preliminary Rejection dated Feb. 16, 2021", w/ English Translation, 4 pgs.

"U.S. Appl. No. 16/774,912, Corrected Notice of Allowability dated Apr. 1, 2021", 5 pgs.

"Korean Application Serial No. 10-2021-7001547, Response filed Apr. 7, 2021 to Notice of Preliminary Rejection dated Feb. 16, 2021", w/ English Claims, 15 pgs.

"European Application Serial No. 17805077.9, Communication Pursuant to Article 94(3) EPC dated May 31, 2021", 6 pgs.

"U.S. Appl. No. 15/362,287, Notice of Allowance dated Feb. 7, 2019", 10 pgs.

"U.S. Appl. No. 16/404,365, Examiner Interview Summary dated Nov. 21, 2019", 3 pgs.

"U.S. Appl. No. 16/404,365, Non Final Office Action dated Sep. 6, 2019", 13 pgs.

"U.S. Appl. No. 16/404,365, Notice of Allowability dated Mar. 26, 2020", 5 pgs.

"U.S. Appl. No. 16/404,365, Notice of Allowance dated Dec. 11, 2019", 8 pgs.

"U.S. Appl. No. 16/404,365, Response filed Nov. 22, 2019 to Non Final Office Action dated Sep. 6, 2019", 8 pgs.

"U.S. Appl. No. 16/774,912, Non Final Office Action dated Sep. 17, 2020", 13 pgs.

"U.S. Appl. No. 16/774,912, Notice of Allowance dated Dec. 16, 2020", 9 pgs.

"U.S. Appl. No. 16/774,912, Response filed Nov. 30, 2020 to Non Final Office Action dated Sep. 17, 2020", 9 pgs.

"European Application Serial No. 17805077.9, Response filed Dec. 2, 2019 to Communication Pursuant to Rules 161(1) and 162 EPC dated Jul. 5, 2019", 16 pgs.

"International Application Serial No. PCT/US2017/061338, International Preliminary Report on Patentability dated Jun. 6, 2019", 8 pgs.

"International Application Serial No. PCT/US2017/061338, International Search Report dated Feb. 21, 2018", 3 pgs.

"International Application Serial No. PCT/US2017/061338, Written Opinion dated Feb. 21, 2018", 6 pgs.

"Korean Application Serial No. 10-2019-70118277, Notice of Decision to Grant dated Oct. 28, 2020", 2 pgs.

"Korean Application Serial No. 10-2019-7018277, Notice of Preliminary Rejection dated Jun. 29, 2020", W/English Translation, 6 pgs.

"Korean Application Serial No. 10-2019-7018277, Response filed Aug. 10, 2020 to Notice of Preliminary Rejection dated Jun. 29, 2020", w/ English Claims, 24 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

\* cited by examiner

PROCESSING MEDIA CONTENT IN A MESSAGING SYSTEM

CLAIM OF PRIORITY

This application is a continuation of and claims the benefit of priority of U.S. patent application Ser. No. 16/774,912, filed on Jan. 28, 2020, which is a continuation of and claims the benefit of priority of U.S. patent application Ser. No. 16/404,365, filed on May 6, 2019, which is a continuation of and claims the benefit of priority of U.S. patent application Ser. No. 15/362,287, filed on Nov. 28, 2016, each of which are hereby incorporated by reference herein in their entireties.

BACKGROUND

Sharing media content such as audio, images, and video between user devices (e.g., mobile devices, personal computers, etc.) may entail converting the media content to a format that can be consumed by the receiving device and a large data transfer over a network, depending on the size of a media content item. For example, a video may need to be transcoded into a different format and/or a smaller sized file. Transcoding each media content item may take significant time and processing power. When a user shares multiple media content items at one time, the time and processing power may exceed the capabilities of the user device and the expectations of the user. Moreover, there may be a limit to the amount of items that may be shared at one time due to processing limitation of the user device.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
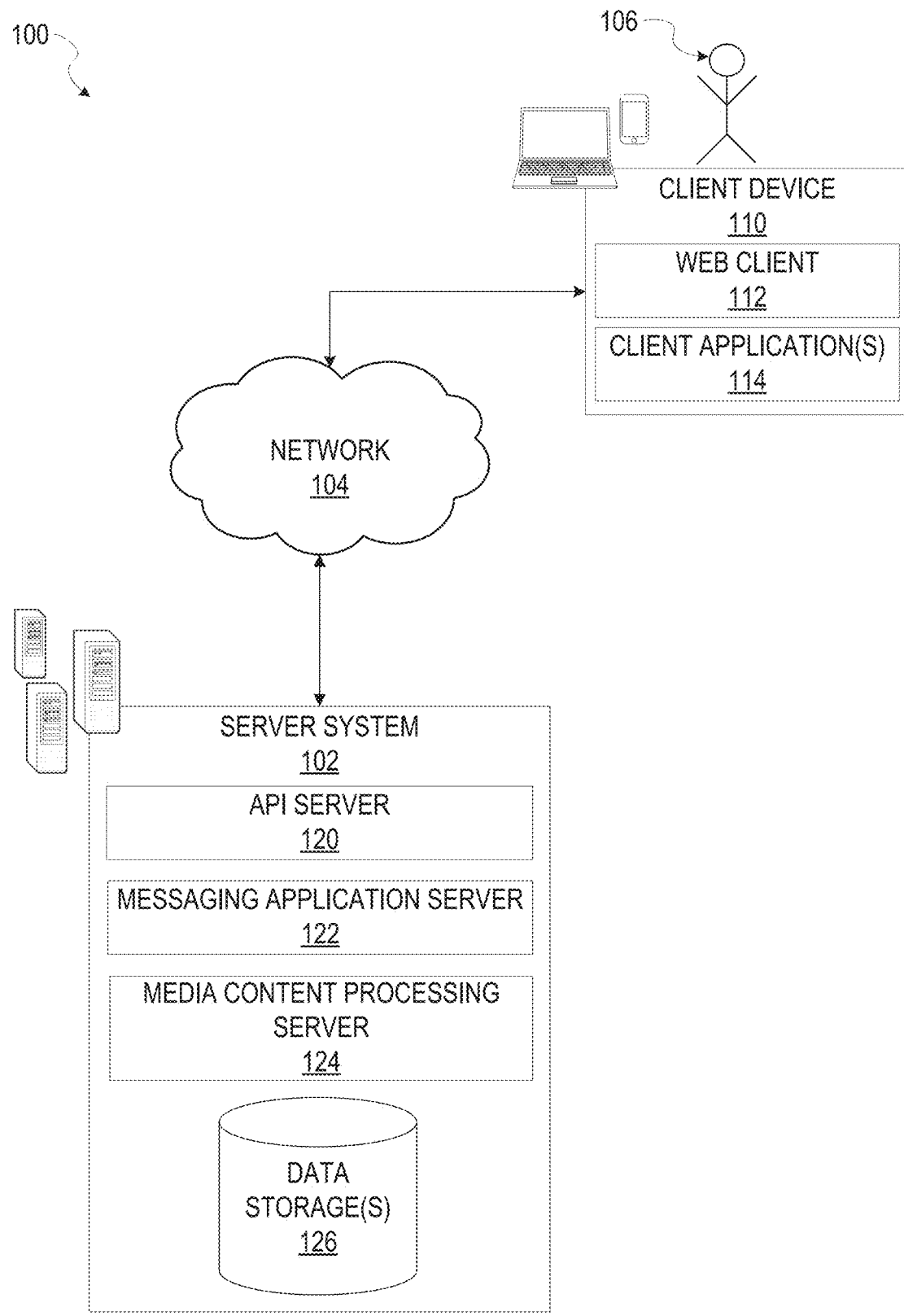
FIG. 1 is a block diagram illustrating a networked system, according to some example embodiments.

Systems and methods described herein relate to processing media content items to be shared between devices via a messaging system. For example, a user may wish to share one or more videos, audio content, images, and so forth with one or more other users. Embodiments described herein provide for receiving, processing, and sending media content items in messages to and from devices operated by users in an efficient manner that minimizes processing power and time on the user device (e.g., the sending device and the receiving device). For example, the original videos, images, etc. created by a user are typically in a high quality format that is not suitable for sharing or viewing on a user device. Converting the high quality media content item on the user device may prove taxing on the processing power of the device and may take more time than expected by a user. For example, and sending user may not expect to wait five minutes to send a video that is only two minutes long, and a receiving user may not expect to wait five minutes to download and view a video that is only two minutes long.

Moreover, a user may want to send a plurality of media content items to one or more users. For example, a user may take various videos and photographs on his vacation. The user may want to share the best videos and photographs from his vacation with his friends and family. The user may select the videos and photographs to share with his friends and family. If the videos and photographs were sent in the original format, it may take a long time to complete the data transfer from the user device to a backend server of a messaging system, and then it may take a long time and processing power for the receiving user device to load the large files for the receiving user to view them. This may be particularly taxing on mobile devices with more limited processing power and memory.

Example embodiments described herein provide for a more efficient system for processing media content to be sent to user devices and received by user devices by using a hybrid approach for processing and transferring media content items. Instead of depending solely on processing power of a user device, time and processing power of the user device may be minimized by utilizing the processing power of a server when possible. For example, the server computer can determine whether any of a plurality of media content items has been previously processed and only instruct the user device to process those media content items that have not yet been processed. In this way, redundancy may be reduced for processing media content items and data transfer of media content items to optimize processing of media content items. Moreover, the speed of media content processing and data transfer may be increased. Also, more advanced processing may be utilized on the server computer to produce higher quality media content items. Furthermore, less processing time and power may be required by the user device.

In one example embodiment, a server computer may receive a request from a first device for instructions to process a plurality of media content items, the request including a unique identifier for each of the plurality of media content items. The server computer may determine, using the unique identifier for each of the plurality of media content items, a subset of the plurality of media content items to be processed by the first device. The server computer may generate instructions for processing the subset of the plurality of media content items by the first device and send the instructions to the first device. The server computer may receive a request from the first device to share the plurality of media content items with a second device, the request including the unique identifier for each of the plurality of media content items to be shared, and processed media content items for the subset of the plurality of media content items, and send the generated message to the second device.

FIG. 1 is a block diagram illustrating a networked system 100, according to some example embodiments, configured to process media content items and send and receive messages which include the processed media content. In one example embodiment, the system is a messaging system configured to receive a plurality of messages from a plurality of users, process media content contained in the messages, and send messages to one or more users with the processed media content. The system 100 may include one or more client devices such as client device 110. The client device 110 may also be referred to herein as a user device. The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronic, game console, set-top box, computers in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to create content media items such as video, images (e.g., photographs), audio, and send and receive messages containing such media content items to and from other users.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more applications 114 (also referred to as "apps") such as, but not limited to, a web browser, messaging application, electronic mail (email) application, an e-commerce site application, a mapping or location application, media content editing application, and the like.

In one example, a client application 114 may be a messaging application that allows a user 106 to take a photograph or video, add a caption, or otherwise edit the photograph or video, and then send the photograph or video to another user. The message may be ephemeral and be removed from a receiving user device after viewing or after a predetermined amount of time (e.g., 10 seconds, 24 hours, etc.). The messaging application may further allow a user 106 to create a gallery. A gallery may be a collection of photos and videos which may be viewed by other users "following" the user's gallery (e.g., subscribed to view and receive updates in the user's gallery). The gallery may also be ephemeral (e.g., lasting 24 hours, lasting a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 110. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user 106 to store photographs and videos and create a gallery that is not ephemeral and that can be sent to other users. For example, to assemble photographs and videos from a recent vacation to share with friends and family.

In some embodiments, one or more applications 114 may be included in a given one of the client device 110, and configured to locally provide the user interface and at least some of the functionalities with the application 114 configured to communicate with other entities in the system 100 (e.g., server system 102), on an as needed basis, for data and/or processing capabilities not locally available (e.g., access location information, to authenticate a user 106, to verify a method of payment, access media content stored on a server, sync media content between the client device 110 and a server computer, etc.). Conversely, one or more applications 114 may not be included in the client device 110, and then the client device 110 may use its web browser to access the one or more applications hosted on other entities in the system 100 (e.g., server system 102).

A server system 102 may provide server-side functionality via the network 104 (e.g., the Internet or wide area network (WAN)) to one or more client devices 110. The server system 102 may include an application programming interface (API) server 120, a messaging application server 122, and a media content processing server 124, which may each be communicatively coupled with each other and with one or more data storage(s) 126.

The server system 102 may be a cloud computing environment, according to some example embodiments. The server system 102, and any servers associated with the server system 102, may be associated with a cloud-based application, in one example embodiment. The one or more data storages 126 may be storage devices that store information such as untreated media content, original media content from users 106 (e.g., high quality media content), processed media content (e.g., media content that is formatted for sharing with client devices 110 and viewing on client devices 110), user information, user device information, and so forth. The one or more data storages 126 may include cloud-based storage external to the server system 102 (e.g., hosted by one or more third party entities external to the server system 102). The data storages 126 may include databases, blob storages, and so forth.

The media content processing server 124 may provide functionality to perform various processing of media content items. The media content processing server 124 may access one or more data storages 126 to retrieve stored data to use in processing media content and to store results of processed media content.

The messaging application server 122 may be responsible for generation and delivery of messages between users 106 of client devices 110. The messaging application server 122 may utilize any one of a number of message delivery networks and platforms to deliver messages to users 106. For example, the messaging application server 122 may deliver messages using electronic mail (email), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

As explained above, a user 106 may wish to share various media content items (e.g., videos, audio content, images, etc.) with one or more other users. For example, the user 106 may use the client device 110 or other device to take various videos and photographs on his vacation. The user 106 may want to share the best videos and photographs from his vacation with his friends and family. The user 106 may utilize a client application 114 on the client device 110, such as a messaging application, to select the media content items that he would like to share. The user 106 may also edit the various media content items using the client application 114. For example, the user 106 may add text to the media content item, choose an overlay for the media content item (labels, drawings, other artwork, etc.), may draw on the media content item, crop or alter (e.g., red-eye reduction, focus, color adjustment, etc.) the media content item, and so forth. A media content item that is "untreated" refers to a media content item that has not been edited using the client application 114.

Figure 3:
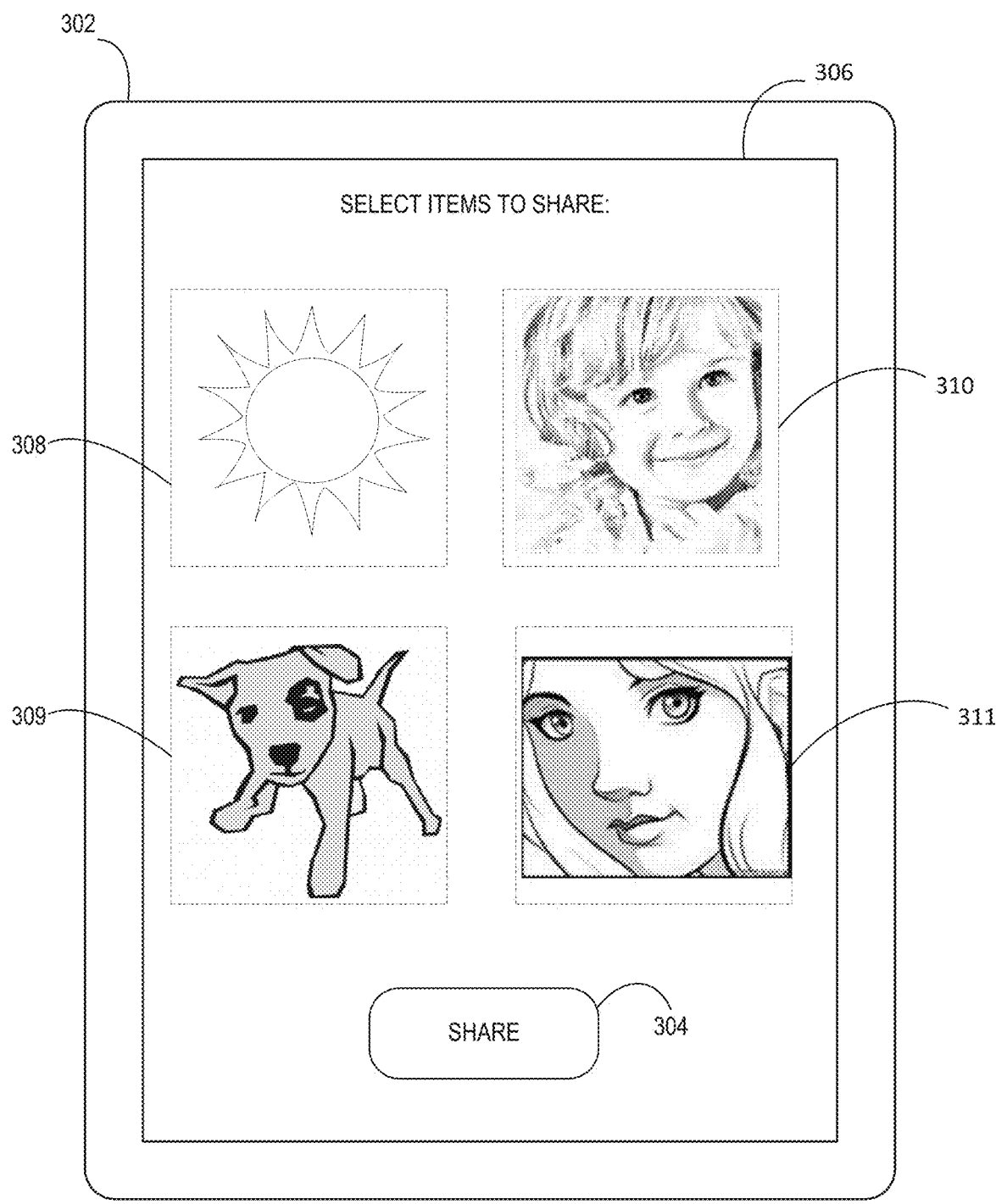
FIG. 3 is an example display on a user device, according to some example embodiments.

The user 106 may select the media content items that he would like to share with his friends and family via the client application 114. Once he has selected the media content items, he may indicate that he would like to share the media content items. For example, he may choose an option on a user interface of the client application 114 (e.g., menu item, button, etc.) to indicate that he wishes to share the media content items. FIG. 3 shows an example display 306 on a user device 302 where a user 106 may select media content items (e.g., 308-311) to share and then select a button 304 to share the selected media content items. As explained above, the media content items may be videos, photographs, and so forth. Also, a user 106 may select a gallery to share that comprises multiple videos, photographs, etc. For example, items 308-311 may each represent a gallery of media content items.

The client device 110 receives the indication to share the media content items from the user 106 and generates a request for instructions to process the media content items. For example, the client device 110 may generate a request that includes a unique identifier associated with each of the media content items that the user 106 wishes to share to request instructions from a server system 102 for whether or not the client device 110 should process any of the media content items. For example, a user 106 may choose ten media content items comprising six videos and four images. The user 106 may have previously shared two of the videos and all of the images. Thus, the client device 110 would only need to process four of the videos, instead of all of the videos and images.

Processing a media content item may comprise converting the media content item into a format that may be consumed by a receiving device. For example, video content may be transcoded from one format, to another format that is compatible with a receiving device. In another example, video content may be transcoded so that it is a reduced size for data transfer and viewing on a receiving device. In yet another example, an image may be converted to a format that is compatible with a receiving device and/or reduced in size for data transfer and viewing on a receiving device.

Figure 2:
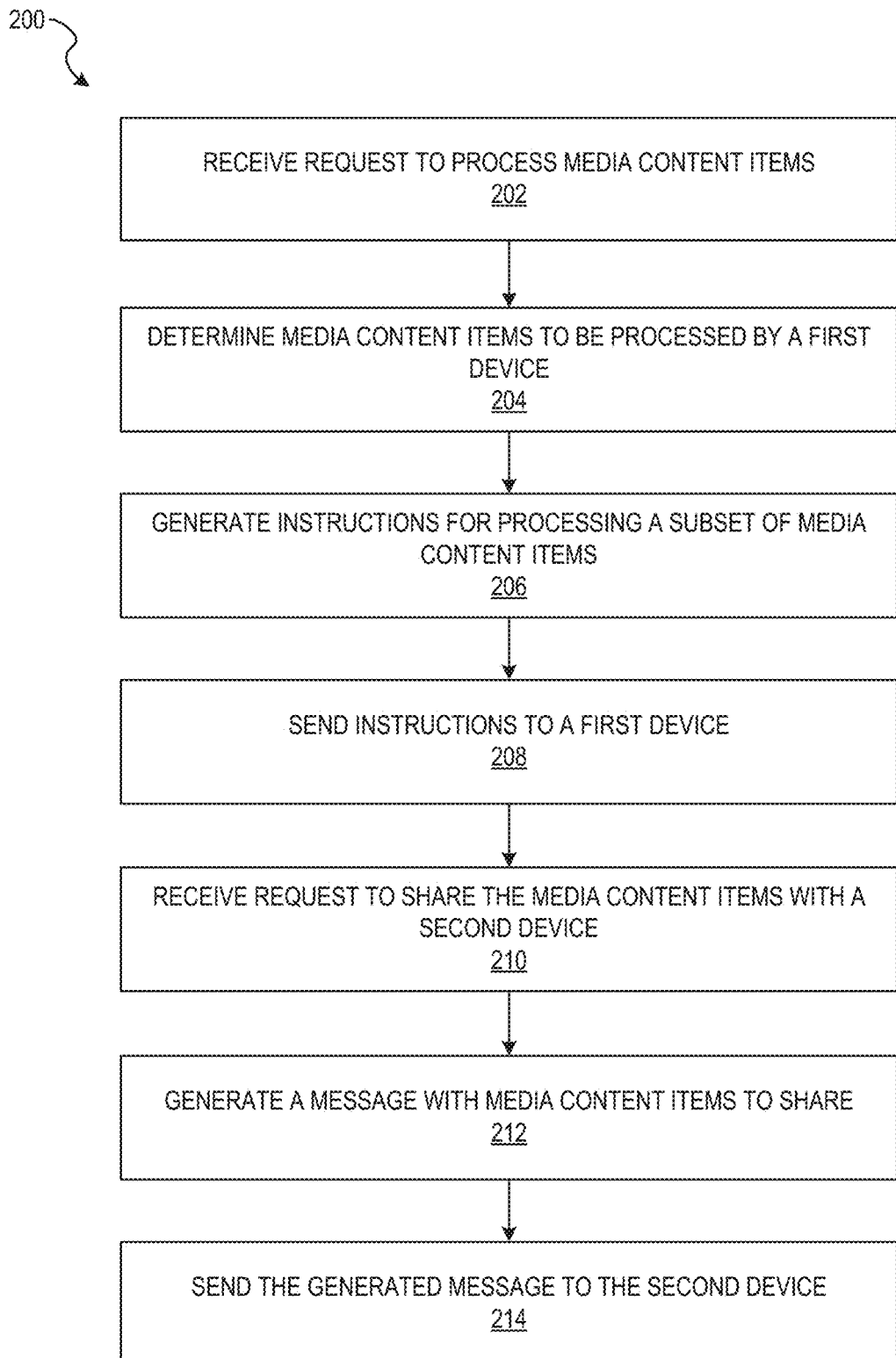
FIG. 2 is a flowchart illustrating aspects of a method, according to some example embodiments.

FIG. 2 is a flow chart illustrating aspects of a method 200, according to some example embodiments, for processing media content items. For illustrative purposes, method 200 is described with respect to the networked system 100 of FIG. 1. It is to be understood that method 200 may be practiced with other system configurations in other embodiments.

In operation 202, the server system 102 (e.g., via API server 120) receives the request from the client device 110 for instructions to process a plurality of media content items from the client device 110. As explained above, the request may include a unique identifier for each of the plurality of media content items.

In one example, the request may further include untreated media content items. For example, a user 106 may want to send original media content items that he did not edit or alter using the client application 114. In this case, the server system 102 may process the untreated media content items.

For example, the client application 114 may provide a number of creative tools for the user 106 to use to edit a media content item, as explained above. If the user 106 has used the creative tools on the client application 114 to edit a media content item, then the media content item may need to be processed on the client device 110 in the event that the server system 102 does not support such creative tools. If the user 106 has not used the creative tools of the client application 114, then the server system 102 may process the media content item. In another example, the server system 102 may support the creative tools used by the user 106 to alter or edit the media content item. In this example, the server system 102 may process the media content item even though it has been altered or edited.

In operation 204, the server system 102 (e.g., via media content processing server 124) determines which media content items are to be processed by the client device 110. The media content items to be processed by the client device 110 may be all of the plurality of media content items, or a subset of the plurality of media content items. For example, the server system 102 accesses one or more data storages 126 to look up the unique identifier associated with each media content item to determine whether or not the media content item already exists (e.g., is stored) in the one or more data storages 126. In one example, the user 106 may have previously sent one or more of the media content items to another user (e.g., individually or as part of a group of media content items) and thus, the media content items may have already been processed and/or the server system 102 may have previously stored the media content items in the one or more data storages 126. In another example, the user 106 may have saved or backed up one or more media content items to the one or more data storages 126. Using the example from above, the plurality of media content items may comprise six videos and four images. The server system 102 may determine that only four videos out of a list of six videos and four images are to be processed by the client device 110 because the other two videos and the four images are already stored in the one or more data storages 126.

In one example embodiment, the server system 102 may store only the original media content item from the user 106, in the one or more data storages 126. The server system 102 may then process the original media content item when needed (e.g., to prepare to send to another user). In another example, the server system 102 may store only the processed media content item in the one or more data storages 126. In yet another example, the server system 102 may store both the original media content item from the user 106 and the processed media content item, in the one or more data storages 126. For example, the server system 102 may process each original media content item received from the user 106 and store both the original media content item and the processed media content item in the one or more data storages 126. In the alternative, the server system 102 may store the original media content item from the user 106 and only process and store the processed media content item when a user 106 requests to share the media content item.

If the request for instructions includes untreated media content items, or media content items that can be processed by the server system 102 (e.g., media content items that were altered or edited by creative tools supported by the server system 102), the server system 102 may store the untreated media content items in one or more data storages 126. The server system 102 may process these media content items and also store the processed version of the media content items, or may process the media content items once it receives a request to share the media content items, as explained below.

In operation 206, the server system 102 generates instructions for processing the of media content items to be processed by the client device 110 (e.g., the media content items that are not stored in one or more data storages 126). For example, the server system 102 may generate a message that includes instructions to process a subset of the plurality of media content items that the user 106 wishes to share (e.g., only four videos out of a list of six videos and four images). The message may comprise the unique identifiers for each media content item of the subset of the plurality of media content items. In operation 208 the server system 102 sends the instructions (e.g., message) to the client device 110.

The client device 110 receives the instructions to process the subset of the plurality of media content items. The client device 110 processes the media content items and generates a request to share the media content items that that the user 106 indicated that he wished to share. The request may include the unique identifier for each of the plurality of media content items to be shared, and the processed media content items for the subset of plurality of media content items that were processed by the client device 110.

The request to share media content items may further include untreated media content items. For example, instead of the client device 110 sending untreated media content items (and/or media content items that can be processed by the server computer because the media content items that were altered or edited by creative tools supported by the server system 102) in the request for instructions for processing media content items, the client device 110 may send the media content items to the server system 102 in the request to share the media content items. The request may include an indication that these media content items should be processed by the server system 102.

In operation 210, the server system 102 (e.g., via API server 120) receives the request to share the media content items with a second device. The server system 102 may store the processed media content items in one or more data storages 126. The server system 102 may store the untreated media content items in one or more data storages 126. The server system 102 may process these untreated content items and also store the processed version of the untreated media content items.

The server system 102 may perform authentication and validation processes before preparing the media content items for sharing. For example, the server system 102 may make sure that the request is received from an authorized and authenticated user 106. The server system 102 may validate the media content items by making sure the unique identifiers are valid identifiers (e.g., they exist in the system), verify that a media content items exists for each unique identifier, making sure each media content item is a proper format for sharing, and so forth.

In operation 212, the server system 102 generates a message with the requested media content items to share with the second device. For example, the server system 102 may access one or more data storages 126 to retrieve each processed media content item to be shared. The server system 102 may process any media content items that may still need to be processed (e.g., media content items that are stored in the one or more data storages 126 in original format and have not yet been processed). The server system 102 prepares a message including the processed media content items to be shared.

In operation 214, the server system 102 sends the generated message to the second device 110. For example, the server system 102 may send the generated message (including any media attachments) directly or relay the generated message to an API (e.g., API server 120 or other server) that is responsible for handling communication with the second device 110. In one example, the generated message may include instructions in the form of a predefined messaging protocol, such as a JSON/XML payload, that includes messages and/or URLs to the actual media attachments.

The second device 110 receives the generated message and may store the message locally on the device. The second device 110 may have one or more client applications 114 (e.g., a messaging application) that a user 106 of the second device 110 may use to access and view the message. The user 106 may select the message to be viewed and the second device 114 may cause the message and the media content items to be displayed to the user 106.

Example embodiments may further include mechanisms to monitor user behavior related to which media content items are locally stored versus in off-line storage (e.g., cloud-based storage), which media content items are shared out of the stored media content items, how frequently the same media content items are shared, etc. This data may be stored and used to anticipate user behavior and optimize the flow of processing. For example, if the server system 102 determines a particular user 106 typically shares media content items related to a specific subject matter (e.g., sporting event, children), the server system 102 may process some of these media content items in advance (e.g., before a user 106 decides to share the media content items) so that they are already processed when the user 106 decides to share the media content items.

Figure 4:
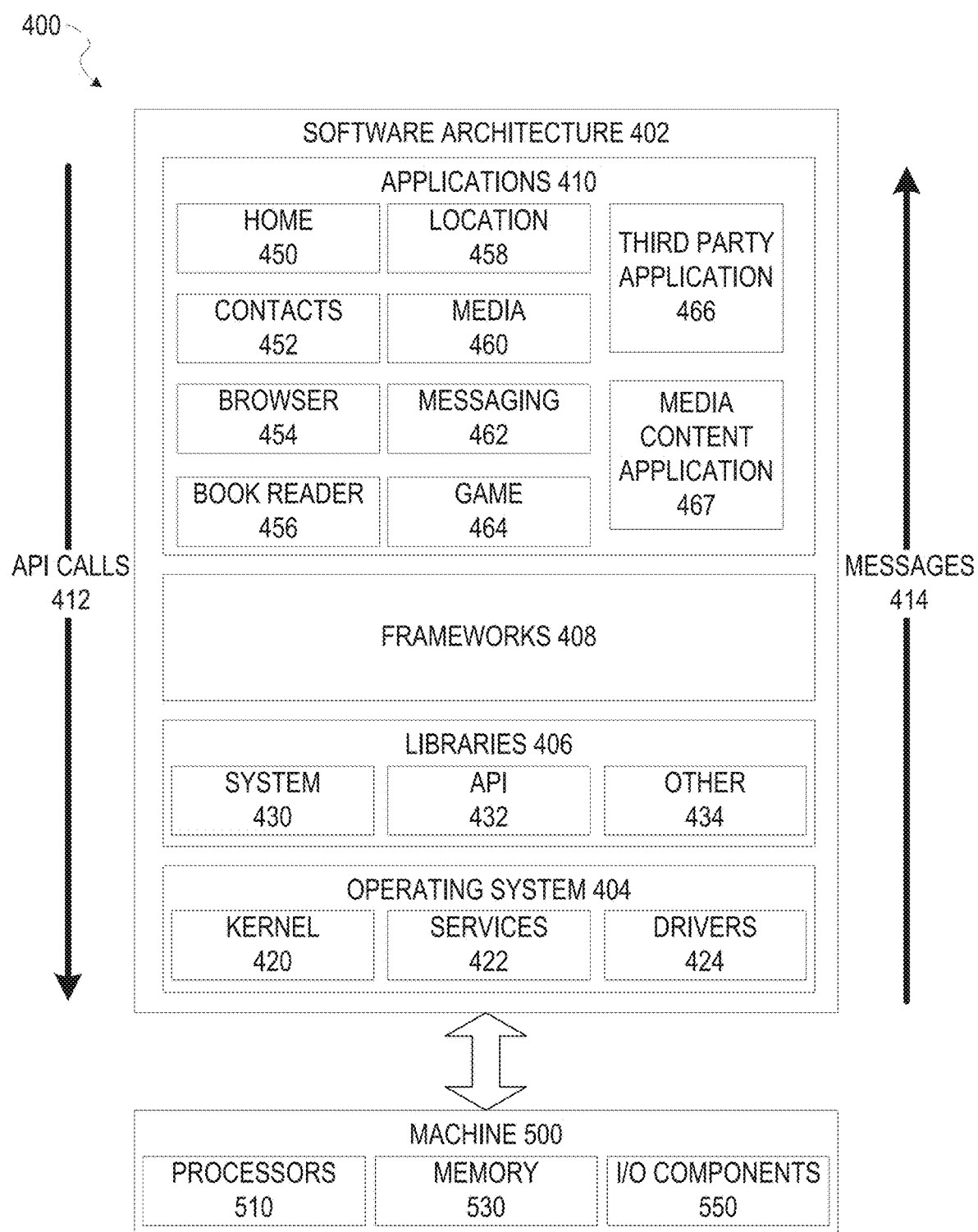
FIG. 4 is a block diagram illustrating an example of a software architecture that may be installed on a machine, according to some example embodiments.

FIG. 4 is a block diagram 400 illustrating software architecture 402, which can be installed on any one or more of the devices described above. For example, in various embodiments, client devices 110 and server systems 102, 120, 122, and 124 may be implemented using some or all of the elements of software architecture 402. FIG. 4 is merely a non-limiting example of a software architecture, and it will be appreciated that many other architectures can be implemented to facilitate the functionality described herein. In various embodiments, the software architecture 402 is implemented by hardware such as machine 500 of FIG. 5 that includes processors 510, memory 530, and I/O components 550. In this example, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke application programming interface (API) calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphic user interface (GUI) functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications such as a third party applications 466 and 467. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 466 can invoke the API calls 412 provided by the operating system 404 to facilitate functionality described herein.

As explained above, some embodiments may particularly include a messaging application 462. In certain embodiments, this may be a stand-alone application that operates to manage communications with a server system such as server system 102. In other embodiments, this functionality may be integrated with another application such as a media content editing application 467. Messaging application 462 may request and display various media content items and may provide the capability for a user to input data related to media content items via a touch interface, keyboard, or using a camera device of machine 500, communication with a server system via I/O components 550, and receipt and storage of media content items in memory 530. Presentation of media content items and user inputs associated with media content items may be managed by messaging application 462 using different frameworks 408, library 406 elements, or operating system 404 elements operating on a machine 500.

Figure 5:
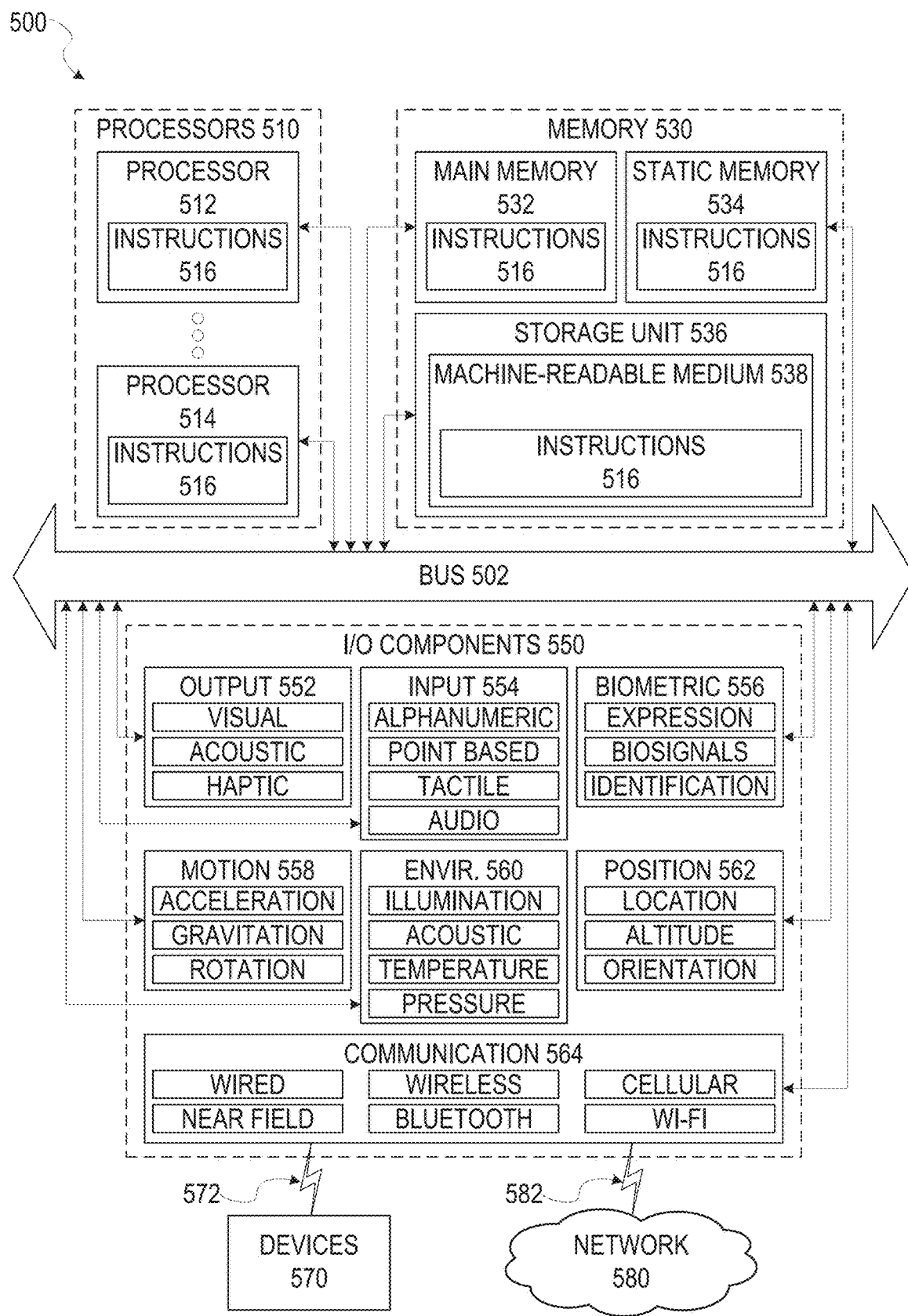
FIG. 5 illustrates a diagrammatic representation of a machine, in the form of a computer system, within which a set of instructions may be executed for causing the machine to perform any one or more of the methodologies discussed herein, according to an example embodiment.

FIG. 5 is a block diagram illustrating components of a machine 500, according to some embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application 410, an applet, an app, or other executable code) for causing the machine 500 to perform any one or more of the methodologies discussed herein can be executed. In alternative embodiments, the machine 500 operates as a standalone device or can be coupled (e.g., networked) to other machines. In a networked deployment, the machine 500 may operate in the capacity of a server machine 102, 120, 122, 124, etc. or a client device 110 in a server-client network environment, or as a peer machine in a peer-to-peer (or distributed) network environment. The machine 500 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

In various embodiments, the machine 500 comprises processors 510, memory 530, and I/O components 550, which can be configured to communicate with each other via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 512 and a processor 514 that may execute the instructions 516. The term "processor" is intended to include multi-core processors 510 that may comprise two or more independent processors 512, 514 (also referred to as "cores") that can execute instructions 516 contemporaneously. Although FIG. 5 shows multiple processors 510, the machine 500 may include a single processor 510 with a single core, a single processor 510 with multiple cores (e.g., a multi-core processor 510), multiple processors 512, 514 with a single core, multiple processors 510, 512 with multiples cores, or any combination thereof.

The memory 530 comprises a main memory 532, a static memory 534, and a storage unit 536 accessible to the processors 510 via the bus 502, according to some embodiments. The storage unit 536 can include a machine-readable medium 538 on which are stored the instructions 516 embodying any one or more of the methodologies or functions described herein. The instructions 516 can also reside, completely or at least partially, within the main memory 532, within the static memory 534, within at least one of the processors 510 (e.g., within the processor's cache memory), or any suitable combination thereof, during execution thereof by the machine 500. Accordingly, in various embodiments, the main memory 532, the static memory 534, and the processors 510 are considered machine-readable media 538.

As used herein, the term "memory" refers to a machine-readable medium 538 able to store data temporarily or permanently and may be taken to include, but not be limited to, random-access memory (RAM), read-only memory (ROM), buffer memory, flash memory, and cache memory. While the machine-readable medium 538 is shown, in an example embodiment, to be a single medium, the term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions 516, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 550 include a wide variety of components to receive input, provide output, produce output, transmit information, exchange information, capture measurements, and so on. In general, it will be appreciated that the I/O components 550 can include many other components that are not shown in FIG. 5. The I/O components 550 are grouped according to functionality merely for simplifying the following discussion, and the grouping is in no way limiting. In various example embodiments, the I/O components 550 include output components 552 and input components 554. The output components 552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 550 include biometric components 556, motion components 558, environmental components 560, or position components 562, among a wide array of other components. For example, the biometric components 556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 include acceleration sensor components (e.g., accelerometer), gravitation sensor components, rotation sensor components (e.g., gyroscope), and so forth. The environmental components 560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 550 may include communication components 564 operable to couple the machine 500 to a network 580 or devices 570 via a coupling 582 and a coupling 572, respectively. For example, the communication components 564 include a network interface component or another suitable device to interface with the network 580. In further examples, communication components 564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 570 may be another machine 500 or any of a wide variety of peripheral devices (e.g., a peripheral device coupled via a Universal Serial Bus (USB)).

Moreover, in some embodiments, the communication components 564 detect identifiers or include components operable to detect identifiers. For example, the communication components 564 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 564, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 516 are transmitted or received over the network 580 using a transmission medium via a network interface device (e.g., a network interface component included in the communication components 564) and utilizing any one of a number of well-known transfer protocols (e.g., Hypertext Transfer Protocol (HTTP)). Similarly, in other example embodiments, the instructions 516 are transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Furthermore, the machine-readable medium 538 is non-transitory (in other words, not having any transitory signals) in that it does not embody a propagating signal. However, labeling the machine-readable medium 538 "non-transitory" should not be construed to mean that the medium is incapable of movement; the medium 538 should be considered as being transportable from one physical location to another. Additionally, since the machine-readable medium 538 is tangible, the medium 538 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   sending, by one or more hardware processors of a first computing device, a request to share a plurality of media content items with a second device;

receiving, by the one or more hardware processors of the first computing device, instructions for processing a subset of the plurality of media content items;

processing, by the one or more hardware processors of the first computing device, the subset of the plurality of media content items; and sending, by the one or more hardware processors of the first computing device, processed media content items for the subset of the plurality of media content items;

wherein a message is generated enabling access to the plurality of media content items comprising the processed media content items for the subset of the plurality of media content items and sent to the second device.

2. The method of claim 1, wherein before sending the request to share the plurality of media content items, the method comprises:

receiving a selection of media content items; and generating the request to share the plurality of media content items, based on the selection of media content items.

3. The method of claim 1, wherein processing the subset of the plurality of media content items comprises converting each of the plurality of media content items into a format that may be consumed by a receiving device.

4. The method of claim 3, wherein converting each of the plurality of media content items into a format that may be consumed by a receiving device comprises transcoding video content of one or more of the plurality of media content items so that it is reduced in size for data transfer and viewing on a receiving device.

5. The method of claim 1, where the request for instructions to process a plurality of media content items further includes untreated media content items, and wherein the untreated media content items are stored in one or more databases and wherein the message including the processed media content items for the plurality of media content items is generated using processed media content items for the untreated media content items.

6. The method of claim 1, wherein the request to share further includes untreated media content items to be processed by a server system.

7. The method of claim 1, wherein the plurality of media content items includes at least one of audio, video, or an image.

8. A computing device comprising:
a memory that stores instructions; and
one or more processors configured by the instructions to perform operations comprising:
sending a request to share a plurality of media content items;
receiving instructions for processing a subset of the plurality of media content items;
processing the subset of the plurality of media content items; and
sending processed media content items for the subset of the plurality of media content items;
wherein a message is generated enabling access to the plurality of media content items comprising the processed media content items for the subset of the plurality of media content items and sent to the second device.

9. The computing device of claim 8, wherein before sending the request to share the plurality of media content items, the operations comprise:
receiving a selection of media content items; and
generating the request to share the plurality of media content items, based on the selection of media content items.

10. The computing device of claim 8, wherein processing the subset of the plurality of media content items comprises converting each of the plurality of media content items into a format that may be consumed by a receiving device.

11. The computing device of claim 10, wherein converting each of the plurality of media content items into a format that may be consumed by a receiving device comprises transcoding video content of one or more of the plurality of media content items so that it is reduced in size for data transfer and viewing on a receiving device.

12. The computing device of claim 8, where the request for instructions to process a plurality of media content items further includes untreated media content items, and wherein the untreated media content items are stored in one or more databases and wherein the message including the processed media content items for the plurality of media content items is generated using processed media content items for the untreated media content items.

13. The computing device of claim 8, wherein the request to share further includes untreated media content items to be processed by a server system.

14. The computing device of claim 8, wherein the plurality of media content items includes at least one of audio, video, or an image.

15. A non-transitory computer readable medium comprising instructions stored thereon that are executable by at least one processor to cause a computing device to perform operations comprising:
sending a request to share a plurality of media content items;
receiving instructions for processing a subset of the plurality of media content items;
processing the subset of the plurality of media content items; and
sending processed media content items for the subset of the plurality of media content items;
wherein a message is generated enabling access to the plurality of media content items comprising the processed media content items for the subset of the plurality of media content items and sent to the second device.

16. The non-transitory computer readable medium of claim 15, wherein before sending the request to share the plurality of media content items, the operations comprise:
receiving a selection of media content items; and
generating the request to share the plurality of media content items, based on the selection of media content items.

17. The non-transitory computer readable medium of claim 15, wherein processing the subset of the plurality of media content items comprises converting each of the plurality of media content items into a format that may be consumed by a receiving device.

18. The non-transitory computer readable medium of claim 17, wherein converting each of the plurality of media content items into a format that may be consumed by a receiving device comprises transcoding video content of one or more of the plurality of media content items so that it is reduced in size for data transfer and viewing on a receiving device.

19. The non-transitory computer readable medium of claim 15, where the request for instructions to process a plurality of media content items further includes untreated media content items, and wherein the untreated media content items are stored in one or more databases and wherein the message including the processed media content items for the plurality of media content items is generated using processed media content items for the untreated media content items.

20. The non-transitory computer readable medium of claim 15, wherein the request to share further includes untreated media content items to be processed by a server system.

\* \* \* \* \*